Figure 4:
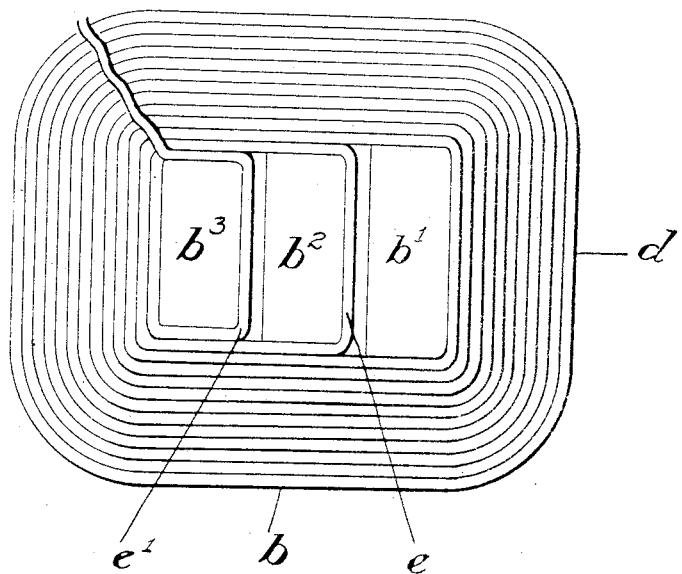

No. 866,286. PATENTED SEPT. 17, 1907.
A. S. KROTZ.
ELECTRIC GENERATOR AND MOTOR.
APPLICATION FILED JAN. 12, 1905.
2 SHEETS—SHEET 1.
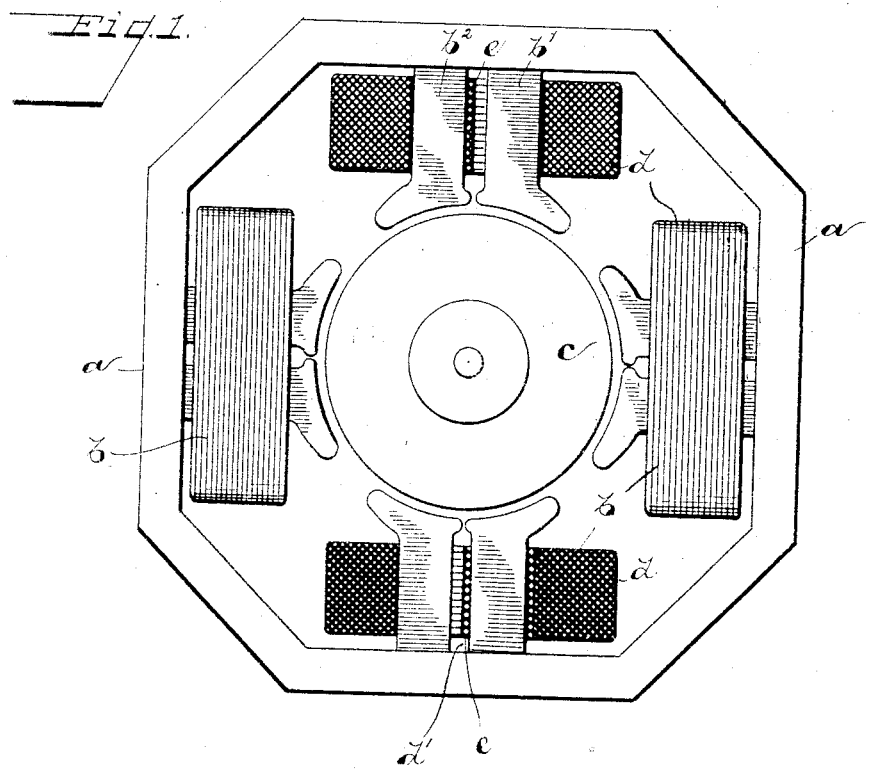
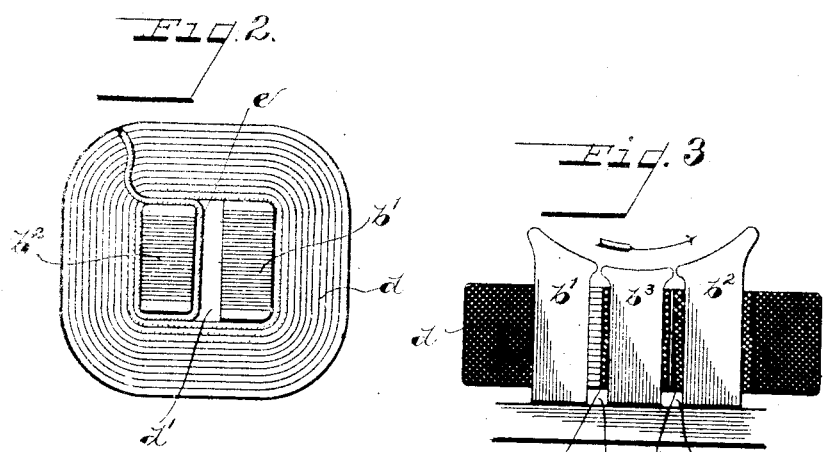
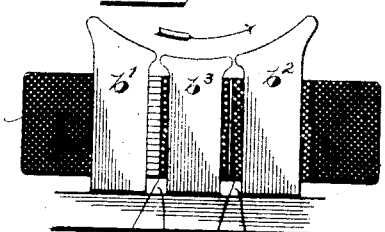

UNITED STATES PATENT OFFICE.

ALVARO S. KROTZ, OF SPRINGFIELD, OHIO, ASSIGNOR OF ONE-HALF TO PAUL A. STALEY, OF SPRINGFIELD, OHIO.

ELECTRIC GENERATOR AND MOTOR.

No. 866,286.  Specification of Letters Patent.  Patented Sept. 17, 1907.

Application filed January 12, 1905. Serial No. 240,719.

*To all whom it may concern:*

Be it known that I, ALVARO S. KROTZ, a citizen of the United States, residing at Springfield, in the county of Clark and State of Ohio, have invented certain new and useful Improvements in Electric Generators and Motors, of which the following is a specification.

My invention relates to improvements in electric generators and motors, and the object of my invention is to provide means for overcoming armature re-action in machines of this character, and thus secure sparkless commutation at the brushes by avoiding the necessity of shifting the brushes. I accomplish this object by the construction of the field magnets themselves by which the lines of magnetic force are caused to flow more uniformly in right lines toward the armature. This I accomplish by forming the magnetic cores in two or more legs separated by spaces through or across which the lines of magnetic force will not pass; and further, by fortifying or increasing the lines of magnetic force in that part of the magnet which is farthest from the pole of the armature upon which the lines of magnetic force from the field magnets are exerting their strongest influence.

In the accompanying drawings a device embodying a simple form of my invention is illustrated, Figure 1 showing a generator or motor in a more or less diagrammatic manner to which my invention is applied. Fig. 2 is an end view of one of the field magnets removed; and Fig. 3 is a side elevation of the magnets of a slightly modified construction. Fig. 4 is a plan view of the windings shown in Fig. 3.

Like parts are represented by similar characters of reference in the several views.

In the drawings $a$ $a$ represent a motor or generator frame, $b$ the field magnets, and $c$ the armature. These field magnets, $b$, are each formed with two or more separate legs, $b^1$, $b^2$, and $b^3$. These several legs form the magnetic core of the field coils, $d$, but they are separated one from the other by spaces, $d^1$ $d^2$, sufficient to prevent the flow of the lines of magnetic force across from one length to the other, these lines being thus compelled to flow longitudinally through the legs and consequently more nearly in right lines to the armature poles, being distributed over a larger surface of the armature and consequently creating a larger zone of magnetic influence of substantially the same strength.

As that portion of the field magnet core which is nearest to that pole of the armature which is being attracted thereto will present the greatest number of lines of magnetic force, by dividing the pole we have two paths, which causes this line of magnetic force to be divided and approach the armature through a wider zone. To more evenly distribute these lines of magnetic force I also provide for fortifying or increasing the magnetic lines through the succeeding legs of the field magnet by giving to these legs an additional winding of one or more turns of the field coils, as shown at $e$. If more than two legs are used, an additional winding is placed on each succeeding one, as shown at $e$ and $e'$ in Fig. 3.

In series wound generators or magnets the winding is started around the auxiliary legs. If more than two are used two turns are given around the last one, then one turn around the first one, and then the coil continued upon all of the legs in the usual manner. Thus, those legs or parts of the core which from the influence of the armature would be robbed of their lines of magnetic force, are fortified and the lines are caused to pass through each of the successive legs with substantially the same magnetic force and the armature reaction overcome, and the necessity for shifting the brushes into the shifting fields of the magnetic fields is obviated and sparking of the commutator under moving legs prevented and the efficiency of the generator thus materially increased.

It will be obvious that the opening between the legs in the armature core need not extend entirely to the end. The legs, or that part of the core which lies next to the armature may be connected together without materially changing the results.

The invention is not confined to any special form of motor or generator but is applicable to any form of motor or generator to which the construction is adapted, either direct current or alternating current devices.

Having thus described my invention, I claim:—

1. In an electric machine, such as described, field magnets formed with two or more sections or legs, one or more of said legs being provided with additional coils and said legs having the additional coils being of smaller diameter to compensate for the additional coils, and main coils extending around all of said legs, substantially as and for the purpose specified.

2. In a machine, such as described, an electro-magnet having two legs or sections, one of said legs or sections being thinner than the other, an inner coil of smaller diameter around said thinner leg to form an additional or supplemental winding about which the main coil of the magnet passes to give additional magnetic power to the leg or pole section whose magnetic lines are reduced by armature re-action, substantially as specified.

In testimony whereof, I have hereunto set my hand this 4th day of January A. D. 1905.

ALVARO S. KROTZ.

Witnesses:
 CHAS. I. WELCH,
 F. LLEWELLYN WALKER.